(12) United States Patent
Huang

(10) Patent No.: US 9,832,544 B2
(45) Date of Patent: Nov. 28, 2017

(54) SIGNAL SENDING DEVICE, SIGNAL RECEIVING DEVICE, AND SIGNAL SENDING AND RECEIVING SYSTEM AND METHOD

(75) Inventor: Jia-Bin Huang, Hsinchu County (TW)

(73) Assignee: PIXART IMAGING INC., Hsinchu County (TW)

(*) Notice: Subject to any disclaimer, the term of this patent is extended or adjusted under 35 U.S.C. 154(b) by 373 days.

(21) Appl. No.: 13/240,511

(22) Filed: Sep. 22, 2011

(65) Prior Publication Data

US 2012/0155388 A1 Jun. 21, 2012

(30) Foreign Application Priority Data

Dec. 17, 2010 (TW) ................................ 99144613 A

(51) Int. Cl.
| | |
|---|---|
| *H04Q 9/00* | (2006.01) |
| *H04W 74/06* | (2009.01) |
| *H04W 84/18* | (2009.01) |
| *H04L 12/26* | (2006.01) |
| *H04W 99/00* | (2009.01) |

(52) U.S. Cl.
CPC .............. *H04Q 9/00* (2013.01); *H04W 99/00* (2013.01); *H04L 43/10* (2013.01); *H04Q 2209/75* (2013.01); *H04W 74/06* (2013.01); *H04W 84/18* (2013.01); *Y02B 60/50* (2013.01)

(58) Field of Classification Search
CPC ..... H04Q 9/00; H04Q 2209/75; H04W 84/18; H04W 74/06; H04W 99/00; Y02B 60/50; H04L 43/10

USPC ..................... 370/328, 338, 389; 340/870.02
See application file for complete search history.

(56) References Cited

U.S. PATENT DOCUMENTS

| | | | |
|---|---|---|---|
| 7,085,681 B1 * | 8/2006 | Williams ............ | G06F 11/0724 702/183 |
| 7,986,676 B2 * | 7/2011 | Waxman ....................... | 370/338 |
| RE43,511 E * | 7/2012 | Keithley ....................... | 235/454 |
| 8,248,267 B2 * | 8/2012 | Johnson et al. ......... | 340/870.02 |
| 8,289,960 B2 * | 10/2012 | Raja et al. ..................... | 370/389 |
| 2004/0044861 A1 * | 3/2004 | Cavallo ................ | G06F 12/122 711/160 |
| 2007/0011364 A1 * | 1/2007 | Wezelenburg .......... | G06F 13/28 710/22 |
| 2008/0056386 A1 * | 3/2008 | Adams ..................... | 375/240.26 |
| 2008/0118007 A1 * | 5/2008 | Fussell .................... | H04L 47/10 375/340 |
| 2009/0156908 A1 * | 6/2009 | Belalcazar ........... | A61B 5/0031 600/301 |
| 2010/0105324 A1 * | 4/2010 | Takayama .................... | 455/41.2 |

(Continued)

*Primary Examiner* — Walter Divito
*Assistant Examiner* — Anthony Luo
(74) *Attorney, Agent, or Firm* — Locke Lord LLP; Tim Tingkang Xia, Esq.

(57) ABSTRACT

A signal sending device, a signal receiving device, and a signal sending and receiving system and method are presented. The devices and system combine a plurality of sense data into a data packet to transmit the data packet. Through the method, the data packet is processed, received, and sent under a transmission mechanism based on independent data packets. Therefore, the plurality of sense data and overhead data are combined into a data packet, and thus the redundant overhead data is reduced, so as to reduce the time spent on sending actual data to a transmission channel, thus improving the efficiency of data exchange and saving electrical energy.

20 Claims, 8 Drawing Sheets

(56) References Cited

U.S. PATENT DOCUMENTS

2010/0128669 A1* 5/2010 Chun .................... H04W 74/06
                                                      370/328
2010/0265179 A1* 10/2010 Ram ............................ 345/163

* cited by examiner

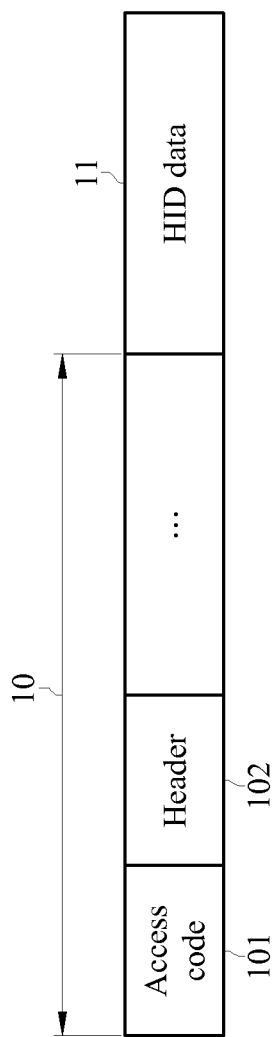
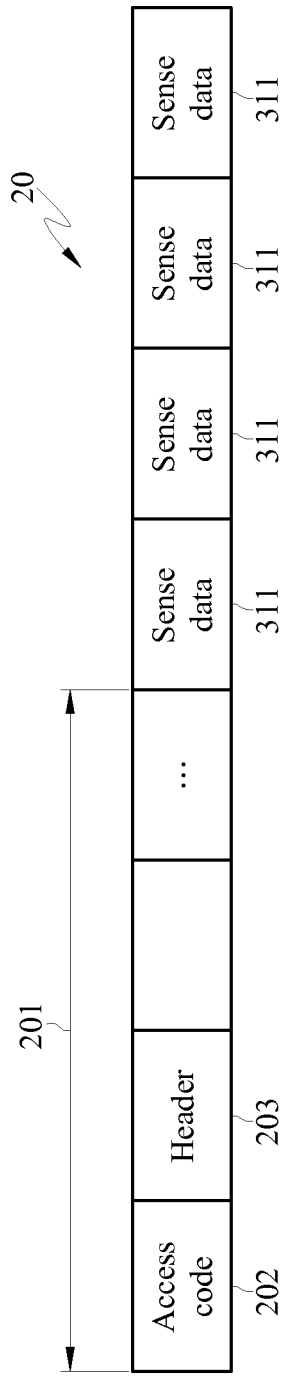
FIG.1 (PRIOR ART)
FIG.2

SIGNAL SENDING DEVICE, SIGNAL RECEIVING DEVICE, AND SIGNAL SENDING AND RECEIVING SYSTEM AND METHOD

CROSS-REFERENCE TO RELATED APPLICATIONS

This non-provisional application claims priority under 35 U.S.C. §119(a) on Patent Application No(s). 099144613 filed in Taiwan, R.O.C. on Dec. 17, 2010, the entire contents of which are hereby incorporated by reference.

BACKGROUND OF THE INVENTION

Field of Invention

The present invention relates to a signal sending device, a signal receiving device, and a sending and receiving method, and more particularly to a signal sending device, a signal receiving device, and a sending and receiving method which combine a plurality of data into a data packet to transmit the data packet.

Related Art

Generally, a Human Interface Device (HID) refers to a media device enabling a user to interact with a machine or a system. For example, a mouse used to operate a personal computer or a notebook computer by the user is a common HID. The HID may be categorized into a wired HID or a wireless HID according to different transmission manners.

The wireless HID is more convenient for use in comparison with the wired HID, as data transmission is not limited by the wiring of a transmission line in the wireless HID. A wireless mouse is taken as an example of the wireless HID for description in the following. In the mouse commercially available at present, the transmission line configured with the wired mouse is about 1.5 meters, and the wireless mouse such as a wireless mouse based on the Bluetooth transmission has an effective transmission distance of about 10 meters. However, the wireless HID still has some features to be improved. In short, when the wireless HID starts to transmit the data, the wireless HID consumes a lot of power to perform transmission, and the transmitted data is apt to be interfered with by the external environment, thus causing short life of a battery and risk of losing the data packet, and therefore the user has negative use experience.

FIG. 1 is a schematic view of a Bluetooth packet on a human-machine interface in the prior art. Referring to FIG. 1, generally, the computer used to receive location information of a Bluetooth mouse may periodically send a polling signal to the Bluetooth mouse at a preset time, so as to obtain the location of the Bluetooth mouse. When the Bluetooth mouse receives the polling signal, the Bluetooth mouse replies the current location information to the computer, and the data exchange between the Bluetooth mouse and the computer is implemented through a standard Bluetooth packet. In other words, every time when the computer sends a polling signal, the Bluetooth mouse may package the location information thereof into a Bluetooth packet and send it to the computer. The Bluetooth packet includes an overhead area 10 and an HID data area 11. The overhead area 10 has the data required for the Bluetooth transmission, and at least includes an access code 101 and a header 102; the HID data area 11 includes the location information of the Bluetooth mouse.

The data required for the Bluetooth transmission in the overhead area 10 is mainly a transmission standard designed for inter-communication between components, that is, the standard Bluetooth communication protocol. However, as for the application of the Bluetooth mouse, the difference between various Bluetooth packets only lies in different location information (that is, the data in the HID data area), and if the location information and the repeated overhead area 10 must be packaged into a new Bluetooth packet in each reply, the redundant overhead area 10 occupies most of the length of the packet and the time on the transmission channel, and also increases the consumption of electrical energy.

Therefore, it is an objective of researchers and manufacturers to develop a method or a manner to achieve more effective data transmission between the wireless HID and a computer host, so that the time spent on the switch of a receiving and transmitting mode and the time spent on sending the actual data to the wireless transmission channel may be reduced, so as to improve the efficiency of data exchange and save energy.

SUMMARY OF THE INVENTION

In order to improve the efficiency of data exchange and save energy of an HID, the present invention is a packet transmission device sharing overhead area data after a plurality of HID data is combined, which reduces the time spent on sending actual data to a transmission channel by shortening the length of a packet, thus improving the efficiency of data exchange and saving electrical energy.

The present invention provides a signal sending device, comprising a sense module, a first processing module and a first receiving-sending transmission module. The sense module samples a plurality of sense data in sequence according to a first period, and the sense data occupy a fixed number of bits. The first processing module combines the plurality of sense data sampled by the sense module and a preset overhead area into a data packet. The first receiving-sending transmission module receives a plurality of polling signals corresponding to the sense data in sequence, and sends the corresponding data packet according to the polling signals at an interval of multiple times of the first period.

The present invention provides a signal receiving device corresponding to the signal sending device, comprising a second receiving-sending transmission module and a second processing module. The second receiving-sending transmission module sends a plurality of polling signals in sequence and receives a plurality of data packets in sequence according to a second period, in which the data packets comprise a plurality of sense data and preset overhead area data. The second processing module is used to parse the data packets, and restore the plurality of sense data in the data packets in batch to correspond to the plurality of polling signals.

The present invention provides a signal sending and receiving system, which integrates the signal sending device and the signal receiving device, and comprises a sense module, a first processing module, a first receiving-sending transmission module, a second processing module and a second receiving-sending transmission module. The first receiving-sending transmission module is used to receive polling signals sent by the second receiving-sending transmission module, and send data packets to the second receiving-sending transmission module correspondingly according to the polling signals.

The present invention further provides a packet transmission method, which combines a plurality of HID data and shares overhead area data so as to process, receive, and send the plurality of HID data under a transmission mechanism based on independent data packets.

The present invention provides a signal sending method. Firstly, a sense data is sampled at an interval of a first period, in which the sense data occupies a fixed number of bits. Then, the plurality of sampled sense data and a preset overhead area data are combined into a data packet, a polling signal is received at an interval of multiple times of the first period, and the data packet is sent according to the polling signal.

The present invention provides a signal receiving method. Firstly, a polling signal is sent at an interval of a second period, so as to receive a data packet having a plurality of sense data and a preset overhead area data. Then, the data packet is parsed, and the sense data in the data packet is restored in batch at an interval of a third period.

The present invention provides a signal sending and receiving method. A sending end samples a sense data at an interval of a first period, in which the sense data occupies a fixed number of bits, and the plurality of sampled sense data and a preset overhead area data are combined into a data packet; a receiving end sends a polling signal to the sending end at an interval of a second period, and the sending end sends the data packet to the receiving end according to the received polling signal; the receiving end parses the received data packet, and restores the sense data in the data packet in sequence at an interval of a third period.

Therefore, through the system, device, and method, the plurality of sense data and the overhead area data are combined into the data packet to perform the processing and transmission of the plurality of sense data under a transmission mechanism based on independent data packets. Thus, the length of the data packet is shortened, and the redundant overhead area data is reduced, so as to reduce the time spent on sending the actual data to the transmission channel, thus improving the efficiency of data exchange and saving electrical energy.

BRIEF DESCRIPTION OF THE DRAWINGS

The present invention will become more fully understood from the detailed description given herein below for illustration only, and thus are not limitative of the present invention, and wherein:

FIG. 1 is a schematic view of a Bluetooth packet on a human-machine interface in the prior art;

FIG. 2 is a schematic structural view of a data packet of the present invention;

DETAILED DESCRIPTION OF THE INVENTION

Figure 3:
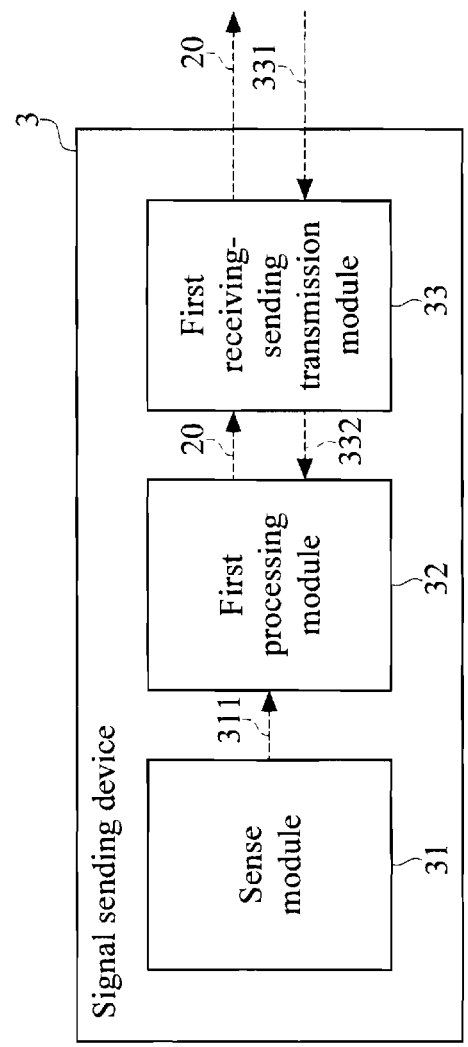
FIG. 3 is a schematic view of an embodiment of a signal sending device of the present invention.

FIG. 2 is a schematic structural view of a data packet of the present invention, and FIG. 3 is a schematic view of an embodiment of a signal sending device of the present invention. Referring to FIGS. 2 and 3, the signal sending device 3 comprises a sense module 31, a first processing module 32 and a first receiving-sending transmission module 33. The sense module 31 samples a plurality of sense data 311 in sequence according to a first period, and the sense data 311 occupies a fixed number of bits. The first processing module 32 combines the plurality of sense data 311 sampled by the sense module 31 and a preset overhead area 201 into a data packet 20. The first receiving-sending transmission module 33 receives a plurality of polling signals 331 corresponding to the sense data in sequence, and sends the data packet 20 according to the polling signals 331 at an interval of multiple times of the first period.

After the first receiving-sending transmission module 33 sends the data packet 20, the first processing module 32 receives confirmation information 332 and correspondingly adjusts the number of the sense signals 311 in the data packet 20 according to the confirmation information 332. According to the receiving condition of the data packet 20, the confirmation signal 332 may be divided into the following two types: one is that the first processing module 32 reduces the number of the sense data 311 in the data packet 20 when the data packet 20 cannot be completely received; the other one is that the first processing module 32 increases the number of the sense data 311 in the data packet 20 within a preset maximum number of bits when the data packet 20 can be completely received. Thus, a good balance is achieved between increasing the number of data combined in the data packet and ensuring complete data transmission. Since it is the still the primary task of successful data sending to ensure complete data transmission, under the premise of ensuring complete data transmission, the number of data combined in the packet may be adjusted according to the actual application condition of the wireless HID. The sending or receiving transmission standard of the data packet 20 conforms to the Bluetooth transmission standard. It should be noted that, the present invention is not intended to limit the transmission standard of the signal transmission device 3, and other non-registered 2.4 GHz transmission standards are also applicable to the present invention. As long as the data packet can combine and share the overhead area, the transmission standard may be properly modified to be applicable to the system and method of the present invention.

In this embodiment, the signal sending device 3 may be implemented on devices including but not limited to a mouse, a dynamic sensing device (such as a video game stick), or a car control key. During the use of such wireless devices, since the wireless devices need to perform data transmission with the host frequently and continuously, the wireless devices may apply the system and method of the present invention. The type of the signal sending device 3 may be different according to different sense modules. The mouse is taken as an example in the following description. The sense module 31 is an optical sense module, and is used to sense a relative displacement relation between the signal sending device 3 and an operation surface (such as a mouse mat), so as to obtain the corresponding sense data 311. As for the dynamic sensing device, the sense module 31 is a motion sense module, and is used to sense a velocity value or an acceleration value of the signal sending device 3 generated in the motion displacement, so as to obtain the corresponding sense data 311, in which the motion sense module may use a gyroscope to detect the velocity value or use a gravity accelerometer to detect the acceleration value. In order to enable the content of the specification to be consistent, the mouse is still taken as an example in the other description of the signal sending device 3, which is for the illustrative purpose only, but is not intended to limit the technical features of the present invention.

In this embodiment, the structure of the data packet comprises preset overhead area data 201 and a plurality of sense data 311. The overhead area data 201 comprises at least an access code 202 and a header 203. The overhead area data 201 conforming to the Bluetooth transmission standard is a technology known by persons of ordinary skill in the art, and therefore is not described in detail herein. However, compared with the packet in the prior art which comprises only single sense data and overhead data, the data packet 20 in the present invention has a plurality of concatenated sense data 311. For example, when the mouse samples four sense data 311 indicating the relative position of the mouse at different time points in a certain time period, according to the conventional method, the mouse may send out the sampled four sense data when receiving four polling signals. According to the system and method of the present invention, since the four sense data 300 are combined into a data packet 20, when the mouse receives the polling signal 331 at the fourth time, the mouse may directly and completely send out the sampled sense data 311 correspondingly according to the received polling signal 331 at the first time, so that the host receives four sense data at a time. Compared with the prior art, the present invention uses a combined manner to send the sense data, thus extending the time spent on replying the polling signal, and therefore the times of sending the packets are reduced so as to reduce the time spent on sending the actual data to the transmission channel, and the electrical energy consumption of the signal sending device 3 is further reduced.

Figure 4:
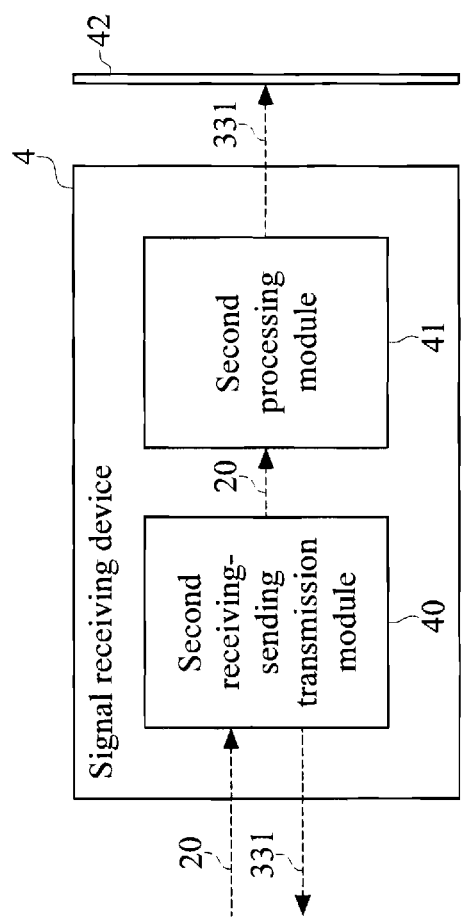
FIG. 4 is a schematic view of an embodiment of a signal receiving device of the present invention.

FIG. 4 is a schematic view of an embodiment of a signal receiving device of the present invention. Referring to FIG. 4, the signal receiving device 4 is similar to the above signal sending device, and uses the same transmission standard and the data packet of the same structure.

In this embodiment, the signal receiving device 4 comprises a second receiving-sending transmission module 40 and a second processing module 41. The second receiving-sending transmission module 40 sends a plurality of polling signals 311 in sequence and receives a plurality of data packets 20 in sequence according to a second period, in which the data packets 20 comprise a plurality of sense data 311 and preset overhead area data 201. The second processing module 41 is used to parse the data packets 20, and restore the plurality of sense data 311 in the data packets 20 in batch to correspond to the plurality of polling signals. The interval time of the second period may be a multiple of the first period in comparison of the above signal sending device, and may be adjusted by a designer. For example, if the first period of the sampling of the sense module is 8 ms, in order to enable the data packet 20 to cascade four sense data 311, the second period may be set to 32 ms. It should be noted that, in view of the feature of the data packet 20 that a plurality of sense data 311 is combined, the second receiving-sending transmission module 40 can extend the interval time of sending the polling signals 331, and reduce the times of sending the polling signals 331 by the signal receiving device 4 in comparison with the conventional method, thus achieving the effect of saving electrical energy. However, the setting of the time is for the exemplary purpose only, but not intended to limit any technical feature of the present invention.

In this embodiment, the signal receiving device 4 may be a Bluetooth receiver (such as a dongle) or a computer host having Bluetooth function. When the signal receiving device 4 receives the data packet 20, the second processing module 41 may perform the parsing operation, and parse and restore the originally cascaded sense data 311 in a third period in sequence for subsequent use. For example, in a Bluetooth mouse, the signal receiving device may send the obtained sense data 311 to an operating system 42 at an interval of a certain period, so that the operating system 42 is informed of the position of the Bluetooth mouse.

Figure 5:
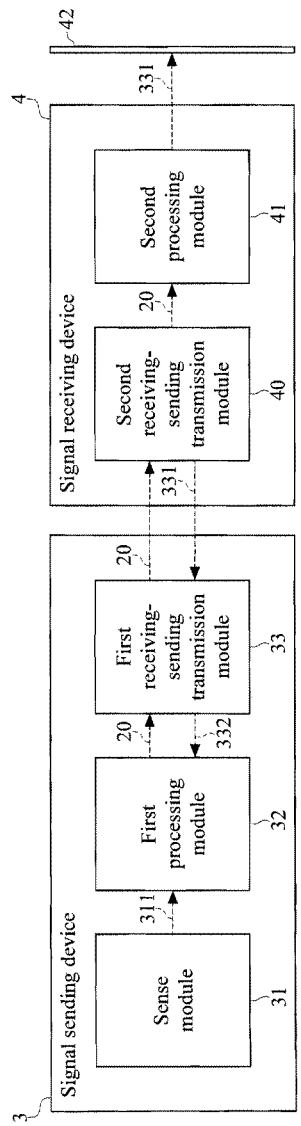
FIG. 5 is a schematic view of a signal sending and receiving system of the present invention.

FIG. 5 is a schematic view of a signal sending and receiving system of the present invention. Referring to FIG. 5, the signal sending and receiving system integrates the signal sending device and the signal receiving device, and the related technology and method are the same as those of the signal sending device and the signal receiving device, which will not be described herein.

Figure 6:
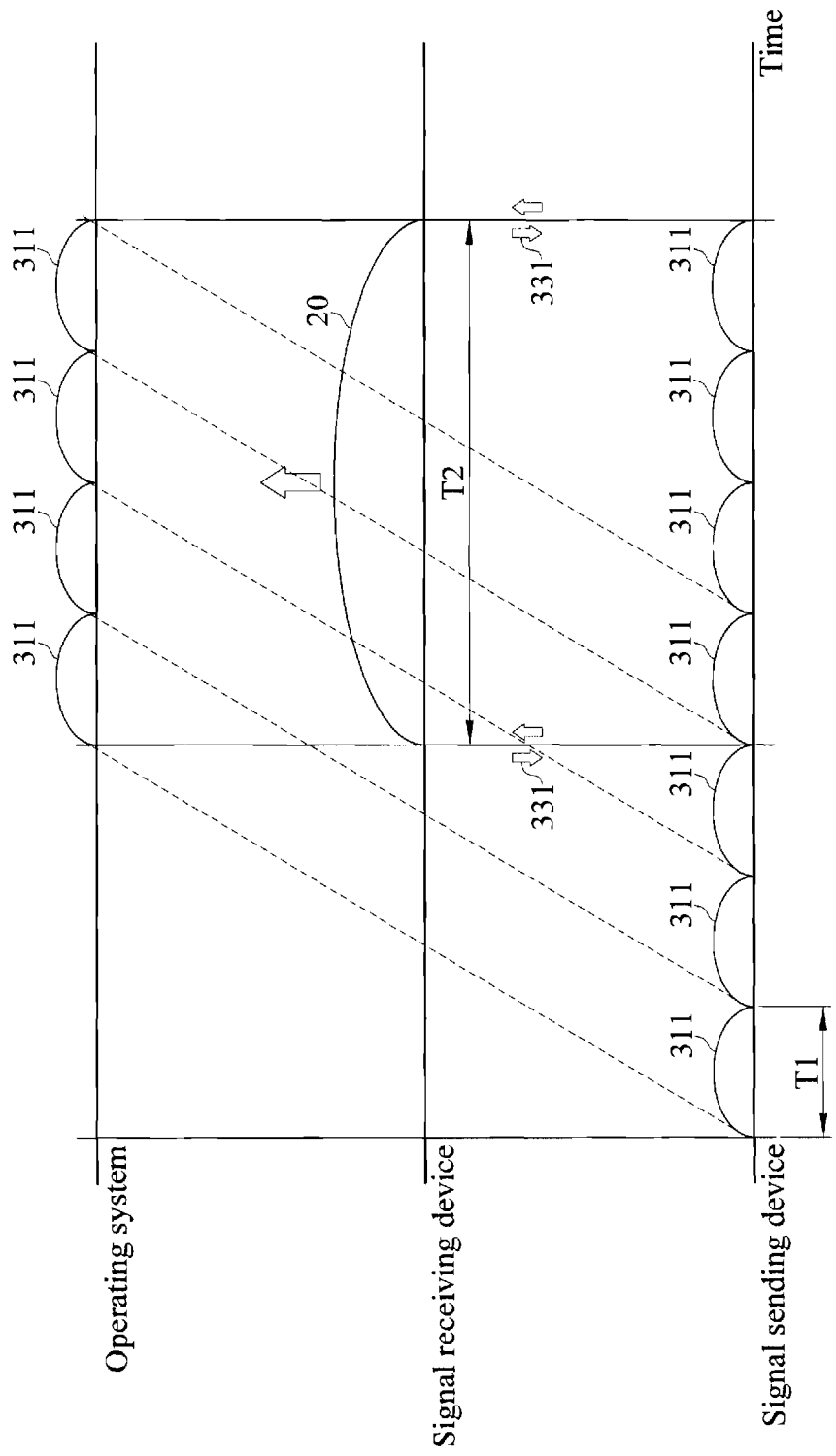
FIG. 6 is a schematic view of the signal transmission time relation in the signal sending and receiving system of the present invention.

FIG. 6 is a schematic view of the signal transmission time relation in the signal sending and receiving system. Referring to FIG. 6, in order to further describe the present invention, the relation between the first period T1 and the second period T2 is described with reference to the schematic view of the signal transmission time relation (FIG. 6) and an example of a Bluetooth mouse. As shown in FIG. 6, in a time period of 64 ms, the mouse (i.e., the signal sending device) samples a sense data 311 every 8 ms, and totally obtains 9 sense data 311 including the originally obtained sense data, and thus 8 ms is the first period T1. In the 64 ms period, the mouse continuously receives polling signals 331 sent by a host (the signal receiving device), but the mouse uses four sense data 311 as a group and combine them into a data packet 20 to be transmitted to the host. The interval time between the first group of the data packet 20 and the second group of the data packet 20 is 32 ms, which is the second period T2. The host parses the data packet 20 after receiving the data packet 20, and sends the sense data 311 in the data packet 20 to the operating system layer in batch, in which the interval time between the parsed sense data 311 is still 8 ms. It can be seen from FIG. 6 that only four times of signal transmission are performed between the mouse and the host, while more times of signal transmission are required in the prior art. That is to say, the times of sending the data packet are effectively reduced in the present invention, thus achieving the effect of saving electrical energy. However, the setting of the time is for the exemplary purpose only, but not intended to limit any technical feature of the present invention.

Figure 7:
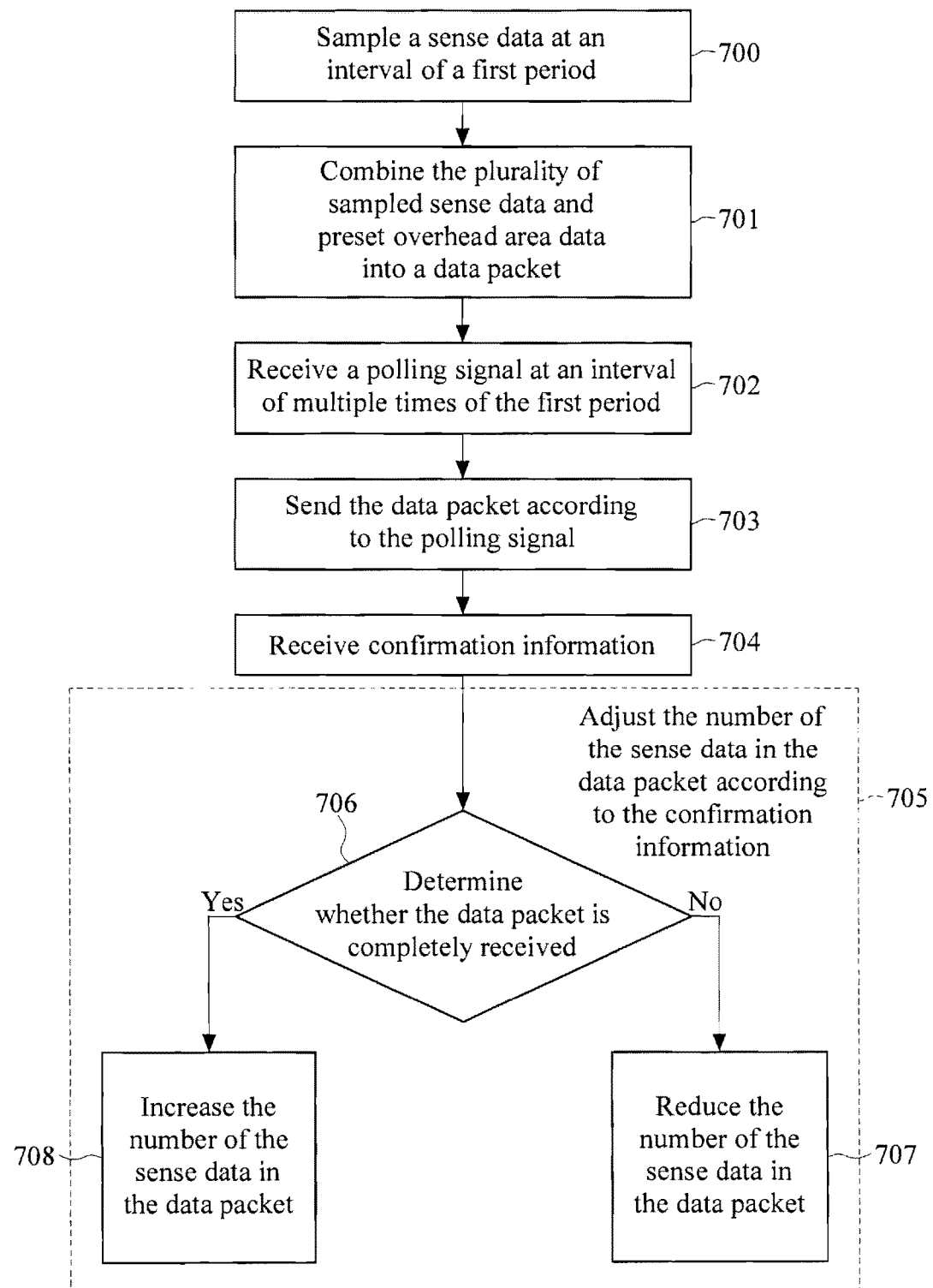
FIG. 7 is a flow chart of a signal sending method of the present invention.

FIG. 7 is a flow chart of a signal sending method of the present invention. Referring to FIG. 7, the signal sending method includes the following steps. A sense data is sampled at an interval of a first period (Step 700), in which the sense data occupies a fixed number of bits. Then, the plurality of sampled sense data and preset overhead area data are combined into a data packet (Step 701); a polling signal is received at an interval of multiple times of the first period (Step 702); and the data packet is sent according to the polling signal (Step 703).

After Step 703, the signal sending method further comprises the following steps. Confirmation information is received (Step 704); and the number of the sense data in the data packet is adjusted according to the confirmation information (Step 705). Step 705 comprises a determining Step (Step 706) for determining whether the data packet is completely received. When the confirmation information indicates that the data packet cannot be completely received, the number of the sense data in the data packet is reduced (Step 707). When the confirmation information indicates that the data packet is completely received, the number of the sense data in the data packet is increased within a preset maximum number of bits (Step 708). The dynamic adjustment of the number of the sense data in the data packet may prevent the problem that the data packet needs to be re-sent due to interference and thus additional electrical energy is consumed.

Figure 8:
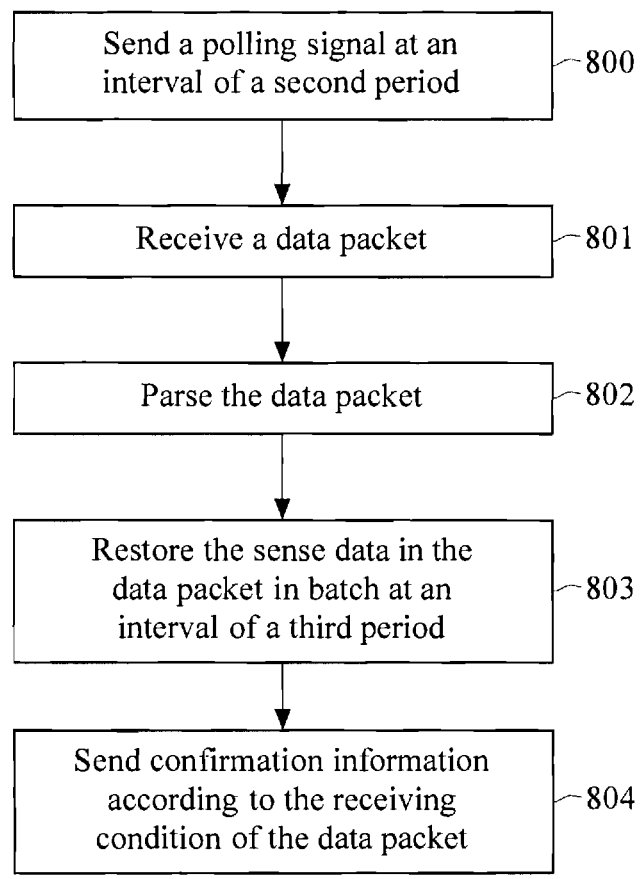
FIG. 8 is a flow chart of a signal receiving method of the present invention.

FIG. 8 is a flow chart of a signal receiving method of the present invention. Referring to FIG. 8, the signal receiving method includes the following steps. A polling signal is sent at an interval of a second period (Step 800), so as to receive a data packet (Step 801), in which the data packet has a plurality of sense data and preset overhead area data. Then, the data packet is parsed (Step 802), and the sense data in the data packet is restored in batch at an interval of a third period (Step 803).

After Step 803, the signal receiving method further comprises Step 804, that is, confirmation information is sent according to the receiving condition of the data packet.

Figure 9:
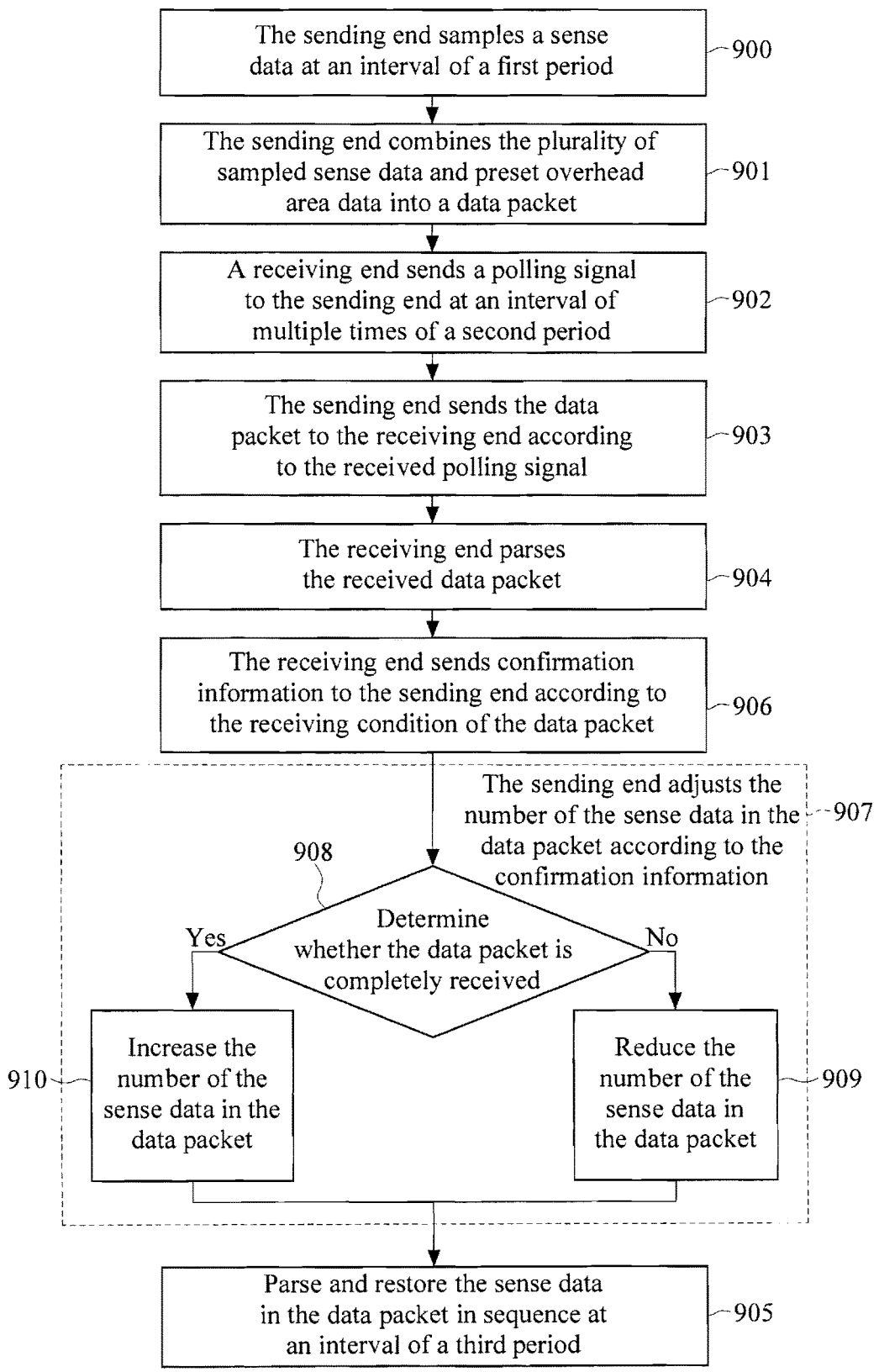
FIG. 9 is a flow chart of a signal sending and receiving method of the present invention.

FIG. 9 is a flow chart of a signal sending and receiving method of the present invention. Referring to FIG. 9, the signal sending and receiving method comprises the following steps. A sending end samples a sense data at an interval of a first period (Step 900), in which the sense data occupies a fixed number of bits, and the plurality of sampled sense data and preset overhead area data are combined into a data packet (Step 901); a receiving end sends a polling signal to the sending end at an interval of a second period (Step 902), and the sending end sends the data packet to the receiving end according to the received polling signal (Step 903); the receiving end parses the received data packet (Step 904), and restores the sense data in the data packet in sequence at an interval of a third period (Step 905). The sending end and the receiving end may be the signal sending device and the signal receiving device described above.

After Step 904, the signal sending and receiving method further comprises the following steps. The receiving end sends confirmation information to the sending end according to the receiving condition of the data packet (Step 906). The sending end adjusts the number of the sense data in the data packet according to the confirmation information (Step 907). Step 907 comprises a determining Step 908 for determining whether the data packet is completely received. When the confirmation information indicates that the data packet cannot be completely received, the number of the sense data in the data packet is reduced (Step 909). When the confirmation information indicates that the data packet is completely received, the number of the sense data in the data packet is increased within a preset maximum number of bits (Step 910).

Therefore, through the system, device, and method described above, the plurality of sense data and the overhead area data are combined into the data packet to perform the processing and transmission of the plurality of sense data under a transmission mechanism based on independent data packets. Thus, the length of the data packet is shortened, and the redundant overhead area data is reduced, so as to reduce the time spent on sending the actual data to the transmission channel, thus improving the efficiency of data exchange and saving electrical energy.

What is claimed is:

1. A signal sending and receiving system, comprising a signal sending device, wherein the signal sending device comprises:
    a sensor, for sampling a plurality of adjacent segments of sense data in sequence, wherein each segment of sense data occupies a fixed number of bits and conforms to a first data format, and a first period exists between two adjacent segments of sense data;
    a first processor, for combining a first number of the plurality of adjacent segments of the sense data into a data packet, wherein the data packet has a preset overhead area, and the first number is an integer greater than 1; and
    a first transceiver, for receiving a plurality of polling signals, and sending the data packet only when a quantity of the received polling signals is equal to the first number, wherein the first processor combines the first number of segments of sense data one by one upon receiving adjacent polling signals, and each of the polling signals corresponds to one of the adjacent segments of the sense data,
    wherein the quantity of the received polling signal is reset to zero when the data packet is sent.

2. The signal sending and receiving system according to claim 1, further comprising a signal receiving device, corresponding to the signal sending device, comprising:
    a second transceiver, for sending a plurality of polling signals in sequence and receiving a plurality of data packets in sequence according to a second period, wherein each of the received data packets contains the plurality of the adjacent segments of the sense data and the preset overhead area, and each of the polling signals corresponds to one of the adjacent segments of the sense data; and
    a second processor, for parsing the received data packets according to the preset overhead area, and restoring the plurality of the adjacent segments of the sense data in the data packets in batch.

3. The signal sending and receiving system according to claim 2, wherein a standard for receiving and sending the data packet by the second transceiver conforms to the Bluetooth transmission standard.

4. The signal sending and receiving system according to claim 2, wherein the preset overhead area comprises an access code and a header.

5. The signal sending and receiving system according to claim 2, wherein a standard for receiving and sending the data by the first transceiver and the second transceiver conforms to the Bluetooth transmission standard.

6. The signal sending and receiving system according to claim 5, wherein the sensor is an optical sensor, and is used to sense relative displacement between the signal sending device and an operation surface and generate the sense data.

7. The signal sending and receiving system according to claim 5, wherein the sensor is a motion sensor, and is used to sense at least one of a velocity value and an acceleration value of the signal sending device and generate the sense data.

8. The signal sending and receiving system of claim 1, further comprising a signal receiving device, wherein the signal receiving device comprises:
    a second transceiver, for sending the plurality of polling signals in sequence and receiving the plurality of data packets in sequence according to a second period, wherein each of the received data packets contains the plurality of the adjacent segments of the sense data and the preset overhead area; and
    a second processor, for parsing the received data packets according to the preset overhead area, and restoring the plurality of the adjacent segments of the sense data in the data packets in batch,
    wherein after the second transceiver receives the data packets, the second transceiver sends confirmation information to the first transceiver.

9. The signal sending and receiving system according to claim 1, wherein when confirmation information indicates that the data packet is not completely received, the first processor reduces the first number of the plurality of the adjacent segments of the sense data in the data packet.

10. The signal sending and receiving system according to claim 1, wherein when confirmation information indicates that the data packet is completely received, the first processor increases the first number of the plurality of the adjacent segments of the sense data in the data packet within a preset number of bits.

11. The signal sending and receiving system according to claim 1, wherein the overhead area comprises an access code and a header.

12. The signal sending and receiving system according to claim 1, wherein after the first transceiver sends the data packet, confirmation information is received, so as to indicate a receiving condition of the data packet, and the first processor adjusts the first number of the plurality of adjacent segments of the sense data in the data packet according to the confirmation information.

13. A signal sending method, comprising:
sampling a plurality of adjacent segments of sense data in sequence, wherein each segment of sense data occupies a fixed number of bits and conforms to a first data format, and a first period exists between two adjacent segments of sense data;
combining a first number of the plurality of the adjacent segments of sense data into a data packet, wherein the data packet has a preset overhead area;
receiving a polling signal at an interval of multiple times of the first period and accumulating a received number;
sending the data packet and resetting the received number only when the received number is equal to the first number, wherein the first number of segments of sense data is combined one by one upon receiving adjacent polling signals, and each of the polling signals corresponds to one of the adjacent segments of the sense data;
receiving confirmation information so as to indicate a receiving condition of the data packet; and
adjusting the first number of the plurality of the adjacent segments of the sense data in the data packet according to the confirmation information.

14. The signal sending method according to claim 13, wherein adjusting the first number of the plurality of the adjacent segments of the sense data in the data packet according to the confirmation information further comprises:
reducing the first number of the plurality of the adjacent segments of the sense data in the data packet when the confirmation information indicates that the data packet is not completely received.

15. The signal sending method according to claim 13, wherein adjusting the first number of the plurality of the adjacent segments of the sense data in the data packet according to the confirmation information further comprises:
increasing the first number of the plurality of the adjacent segments of the sense data in the data packet within a preset number of bits when the confirmation information indicates that the data packet is completely received.

16. The signal sending method according to claim 13, further comprising:
when a sending end samples a plurality of adjacent segments of sense data at an interval of a first period, sending a plurality of polling signals at an interval of a second period, wherein each segment of sense data conforms to a first data format, and each of the polling signals corresponds to one of the adjacent segments of the sense data;
receiving a data packet, wherein the data packet has the plurality of the adjacent segments of the sense data and a preset overhead area, and wherein receipt of the data packet is in response to the transmission of the plurality of the polling signals;
parsing the data packet according to the preset overhead area; and
restoring the plurality of the adjacent segments of the sense data in the data packet at an interval of a third period.

17. The signal sending method according to claim 16, wherein after receiving the data packet, the method further comprises:
sending confirmation information according to a receiving condition of the data packet.

18. A signal sending and receiving method, comprising:
a sending end sampling a plurality of adjacent segments of sense data, wherein each segment of sense data occupies a fixed number of bits and conforms to a first data format, and a first period exists between two adjacent segments of sense data;
the sending end combining a first number of the adjacent segments of the sense data and a preset overhead area into a data packet;
a receiving end sending a plurality of polling signals to the sending end at an interval of a second period, wherein each of the polling signals corresponds to one of the adjacent segments of the sense data;
the sending end sending the data packet to the receiving end only when a quantity of the polling signals received by the sending end is equal to the first number so that a number of sending the data packet is less than a number of the plurality of polling signals received;
the receiving end sending confirmation information to the sending end according to a receiving condition of the data packet;
the sending end adjusting the first number of the plurality of the adjacent segments of the sense data in the data packet according to the confirmation information;
the receiving end parsing the data packet according to the preset overhead area of the data packet; and
the receiving end parsing and restoring the sense data in the data packet in sequence at an interval of a third period;
wherein the sending end combines the first number of segments of sense data one by one upon receiving adjacent polling signals.

19. The signal sending and receiving method according to claim 18, wherein the sending end adjusting the first number of the plurality of the adjacent segments of the sense data in the data packet according to the confirmation information further comprises:
reducing the first number of the plurality of the adjacent segments of the sense data in the data packet when the confirmation information indicates that the data packet is not completely received.

20. The signal sending and receiving method according to claim 18, wherein the sending end adjusting the first number of the plurality of the adjacent segments of the sense data in the data packet according to the confirmation information further comprises:

increasing the first number of the plurality of the adjacent segments of the sense data in the data packet within a number of bits when the confirmation information indicates that the data packet is completely received.

* * * * *